United States Patent [19]
Carlson, Jr. et al.

[11] Patent Number: 5,929,380
[45] Date of Patent: Jul. 27, 1999

[54] OUTSIDE CORNER FITTING FOR USE IN A DUCT SYSTEM

[75] Inventors: Robert C. Carlson, Jr., Torrington; Mark Viklund, Milford, both of Conn.

[73] Assignee: The Siemon Company, Watertown, Conn.

[21] Appl. No.: 08/893,837

[22] Filed: Jul. 11, 1997

Related U.S. Application Data

[63] Continuation of application No. 08/837,980, Apr. 14, 1997.

[51] Int. Cl.⁶ ........................................................ H02G 3/04
[52] U.S. Cl. ..................... 174/68.3; 174/99 R; 52/220.7; 248/48.2; 138/115
[58] Field of Search ................................. 174/48, 21 R, 174/24, 72 A, 72 C, 135, 68.3, 88 R, 95, 99 R; 451/52, 284; 248/49, 48.2; 52/220.5, 220.7; 138/112, 113, 115, 162, 109, 92

[56] References Cited

U.S. PATENT DOCUMENTS

| | | | |
|---|---|---|---|
| 1,844,269 | 2/1932 | Binkley | 174/79 |
| 3,053,358 | 9/1962 | Gross | 52/696 |
| 3,786,171 | 1/1974 | Shira | 174/48 |
| 3,881,520 | 5/1975 | Murphy | 138/109 |
| 4,017,137 | 4/1977 | Parks | 439/135 |
| 4,360,705 | 11/1982 | Rogers | 174/48 |
| 4,874,322 | 10/1989 | Dola et al. | 439/120 |
| 4,951,716 | 8/1990 | Tsunoda et al. | 138/162 |
| 5,161,580 | 11/1992 | Klug | 138/92 |
| 5,469,893 | 11/1995 | Caveney et al. | 138/162 |

FOREIGN PATENT DOCUMENTS 2268837  1/1994  United Kingdom ............... 174/72 C

OTHER PUBLICATIONS

Panduit Catalog, 1 Bend Radius Fittings, date unknown.

Primary Examiner—Dean A. Reichard
Assistant Examiner—Dhiru R Patel
Attorney, Agent, or Firm—Cantor Colburn LLP

[57] ABSTRACT

An outside corner fitting including an arcuate channel having a radius of curvature greater than a predetermined minimum bend radius for the cable to be installed in the duct system. A first embodiment of the invention fits within straight ducts and allows the straight ducts to be placed flush with the outside corner of the wall. A second embodiment features an outside corner fitting that abuts against the straight ducts and is mounted directly to the wall. Both embodiments include a cover having a first edge and a second edge, the first edge being shorter than the second edge. The shorter first edge minimizes the gap between the cover and the wall if the wall is not exactly 90 degrees.

18 Claims, 15 Drawing Sheets

OUTSIDE CORNER FITTING FOR USE IN A DUCT SYSTEM

CROSS REFERENCE TO RELATED APPLICATIONS

This application is a continuation of U.S. patent application Ser. No. 08/837,980 filed Apr. 14, 1997.

BACKGROUND OF THE INVENTION

1. Field of the Invention

The invention relates generally to duct systems for routing cable such as copper wire, optical fiber, etc., and in particular to an outside corner fitting that prevents the bend radius of the cable from going below a predetermined value.

2. Prior Art

Typically in an office environment, especially those with stone or brick walls, telecommunications cables are installed and routed through a surface mounted duct system. Conventional duct systems are typically constructed of metal or plastic, with plastic being the more popular choice for telecommunications cabling. Plastic ducts are offered in a one-piece or two-piece straight extrusion that is mounted along office walls to route cable from floors, ceilings or through walls from adjacent rooms to work area outlets. Several fittings are offered with conventional duct systems to accommodate transitions in the duct such as a flat 90 degree fitting, a T fitting, an inside corner fitting, an outside corner fitting, a joint fitting, an interface fitting and an end cap. Typically, the fittings that are used to transition cables at right angle bends are 90 degree fittings. Some manufacturers offer a plastic outside corner fitting that consists of a cover that snaps over a base and has a sweeping radial outside surface. However, the radial surface only exists in the cover and there is nothing to restrict cables from sharply bending or kinking around the outside corner of the wall. In addition, the fitting has equally long extensions protruding from the 90 degree intersection of the wall thus causing gaps between the fitting and the wall when installed on wall corners that are not exactly 90 degrees.

Conventional fittings do not prevent the bend radius of the cables from going below a predetermined minimum bend radius. This causes kinks or breaks in the cables and reduces or eliminates the ability of the cable to transmit a signal.

SUMMARY OF THE INVENTION

The above-discussed and other drawbacks and deficiencies of the prior art are overcome or alleviated by the outside corner fitting of the present invention. The outside corner fitting of the present invention includes an arcuate channel having a radius of curvature greater than a predetermined minimum bend radius for the cable to be installed in the duct system. Thus, even if tension is applied to the cable forcing the cable against the channel, the bend of the cable will not go below the predetermined minimum bend radius. A first embodiment of the invention fits within a straight duct and allows the straight duct to be placed flush with the outside corner of the wall. A second embodiment features an outside corner fitting that abuts against the straight ducts and is mounted directly to the wall. Both embodiments include a cover having a short edge adjacent a first wall and a long edge adjacent a second wall. The short edge minimizes the gap between the cover and the wall if the wall is not exactly 90 degrees.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DETAILED DESCRIPTION OF THE INVENTION

Figure 1:
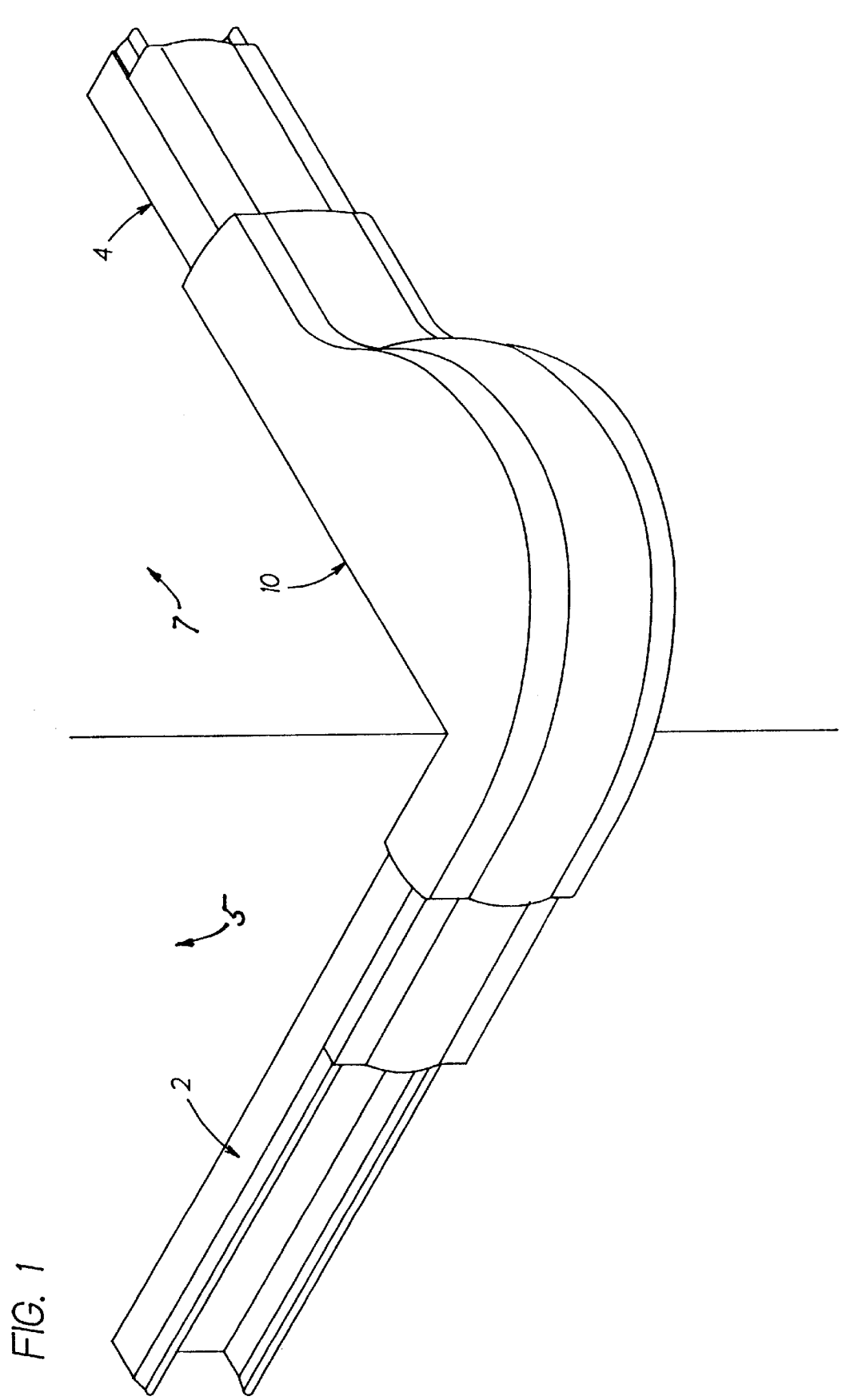
FIG. 1 is a perspective view of the outside corner fitting coupled to two straight duct pieces and mounted to a wall.
Figure 2:
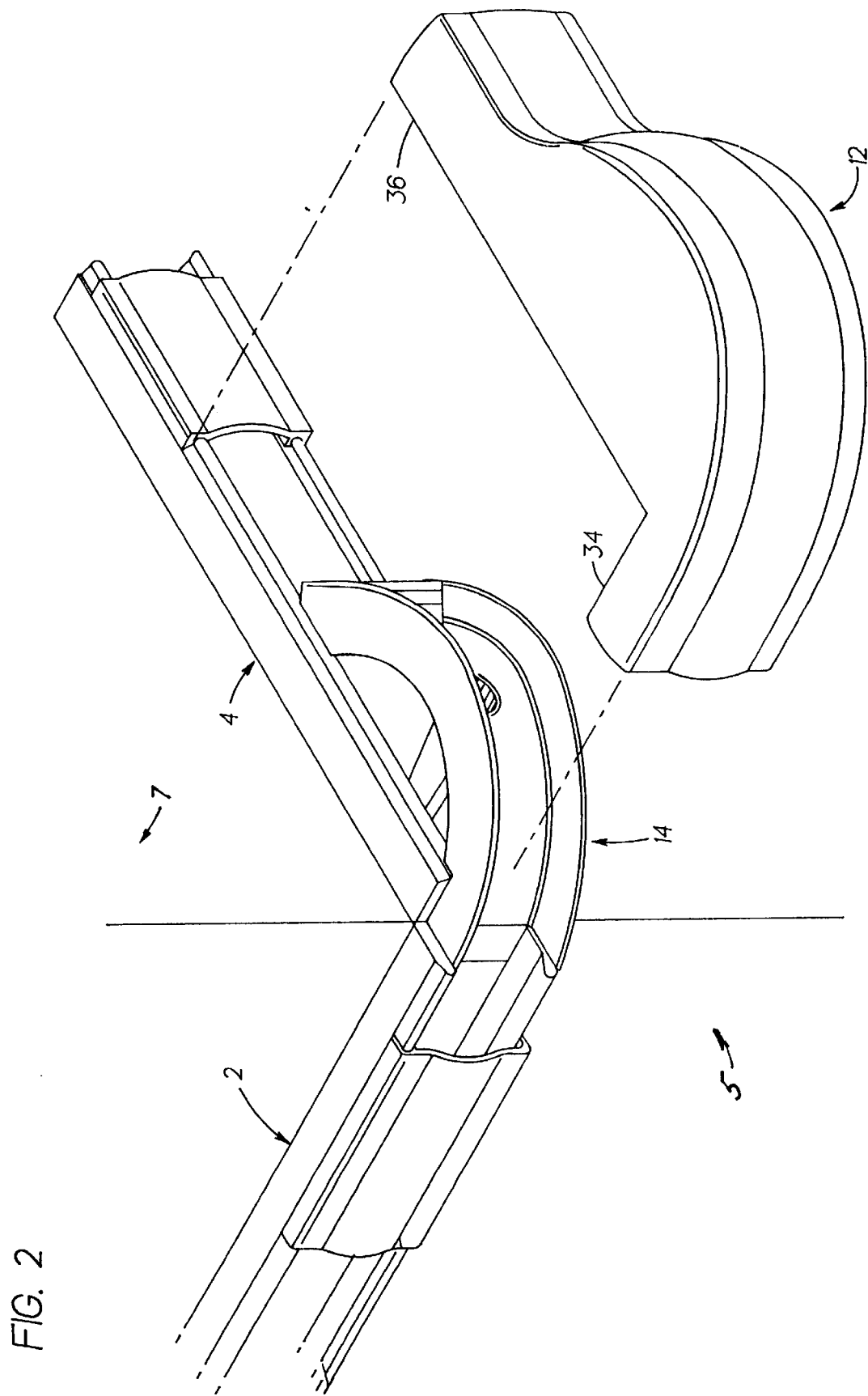
FIG. 2 is an exploded, perspective view showing the outside corner fitting cover detached from the outside corner fitting base.

FIG. 1 is a perspective view of the outside corner fitting, shown generally at 10, coupled to a first straight duct 2 and a second straight duct 4. The straight ducts 2 and 4 and the outside corner fitting 10 are mounted to a wall. FIG. 2 is an exploded, perspective view showing the outside corner fitting 10. As shown in FIG. 2, the outside corner fitting 10 includes a cover 12 and a base 14. In accordance with an important feature of the invention, the base 14 fits within the interior channel of each straight duct 2 and 4. This allows each straight duct 2 and 4 to be flush with the outside corner of the wall. Thus, the installer does not have to cut the straight ducts 2 and 4 to a predetermined distance away from the outside corner. The straight ducts 2 and 4 are cut to be flush with the outside corner. This eliminates the need to measure a predetermined distance from the outside corner and simplifies installation.

Figure 3:
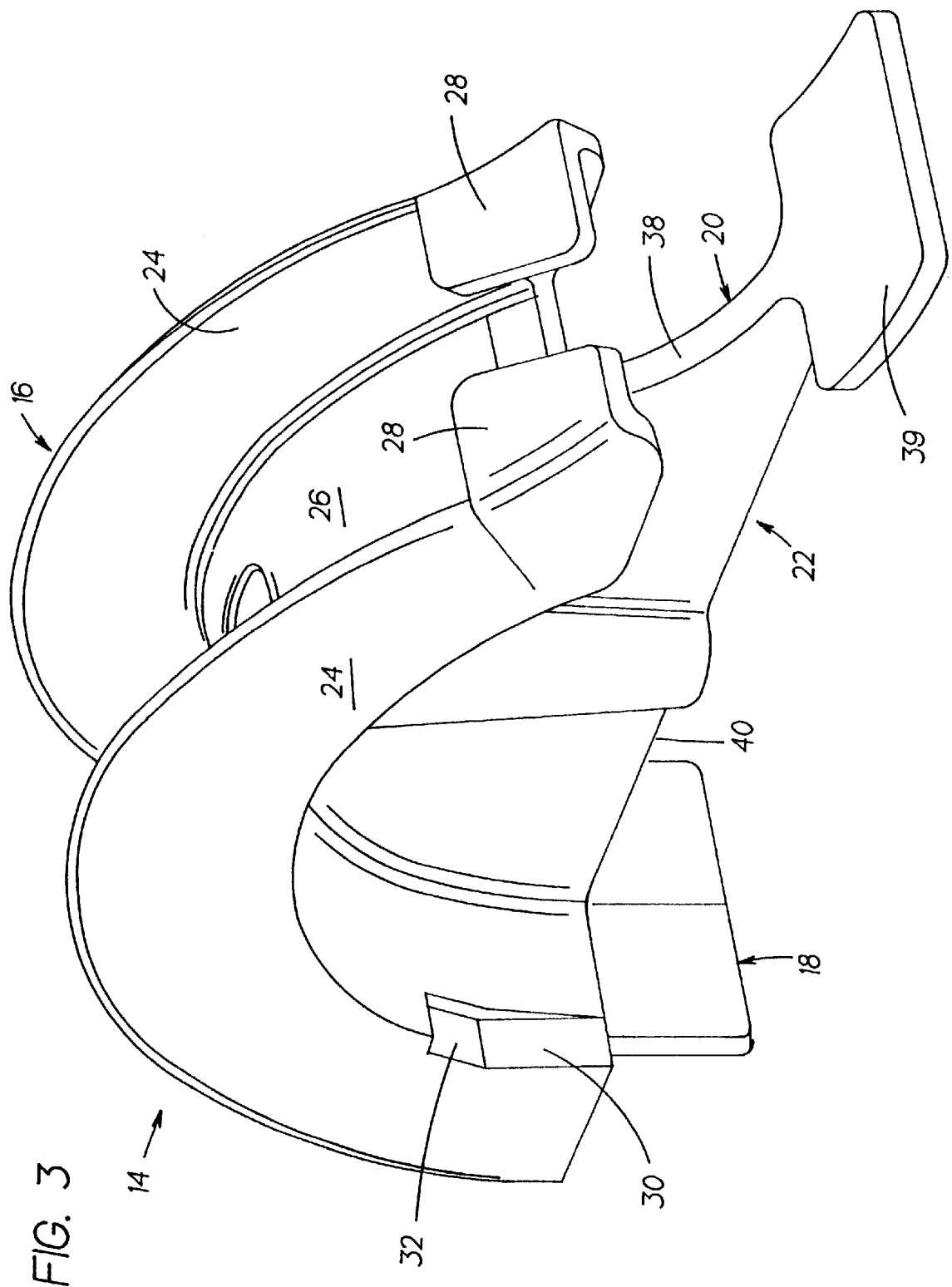
FIG. 3 is a perspective view of the base of the outside corner fitting.
Figure 4:
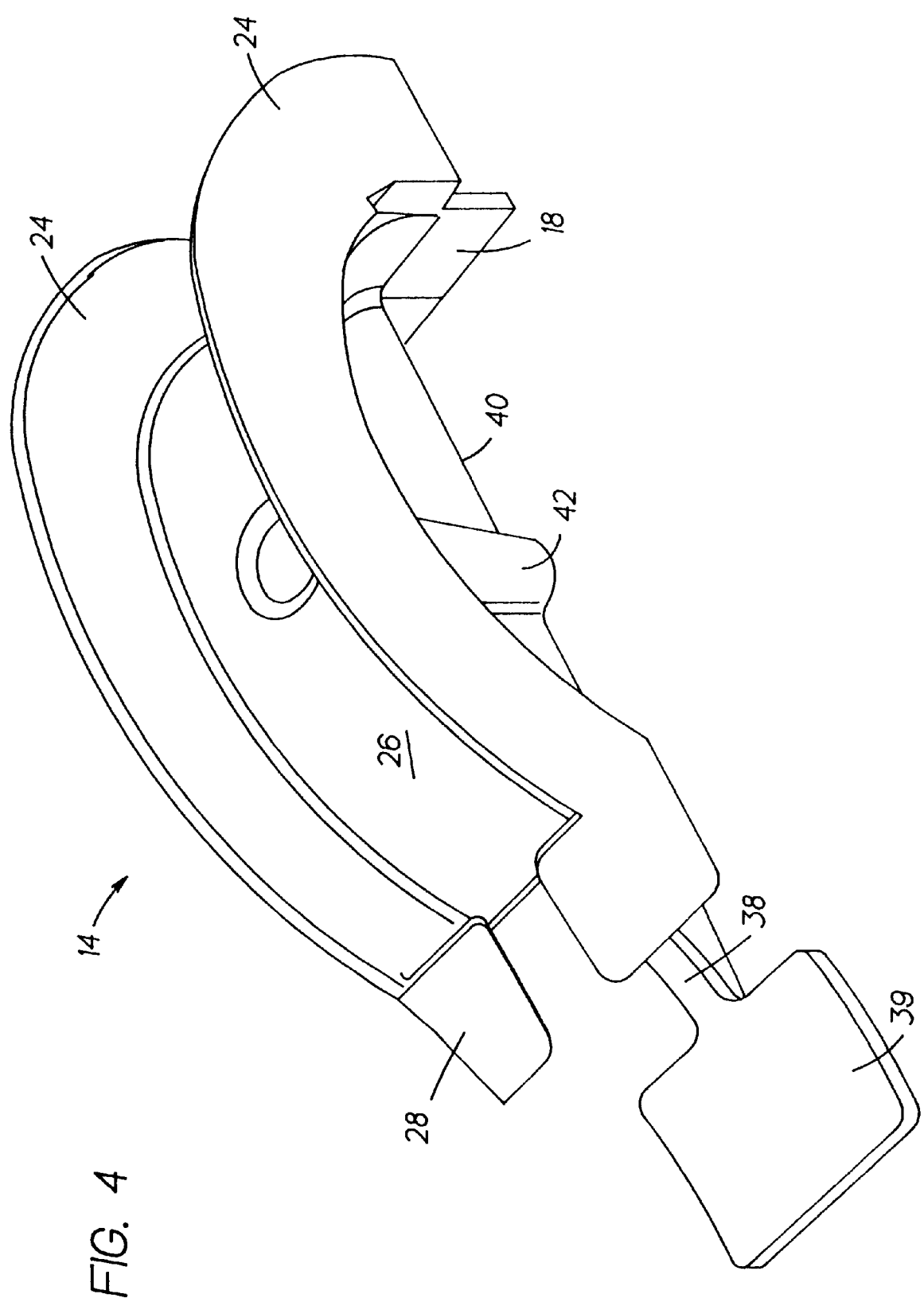
FIG. 4 is another perspective view of the base.
Figure 5:
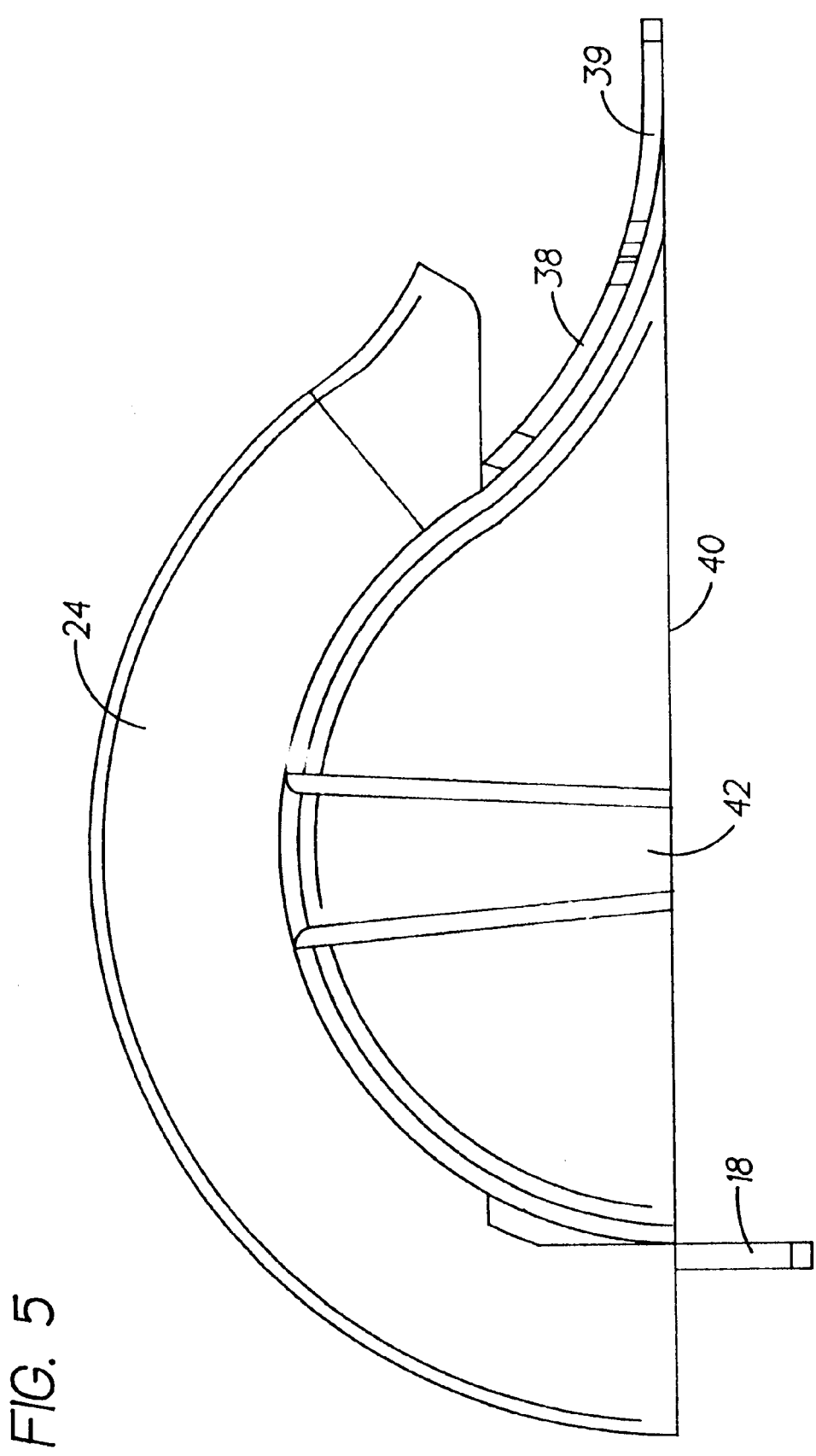
FIG. 5 is a side view of the base.

FIG. 3 is a perspective view of the base 14. The base 14 includes an arcuate channel 16, a first extension 18, a second extension 20 and a support rib 22. The arcuate channel 16 is generally U-shaped and is made up of side walls 24 integral with and substantially perpendicular to a bottom wall 26. In accordance with an important aspect of the invention, the bottom wall 26 has an arcuate shape having a radius of curvature which is greater than the minimum bend radius of the cable to be installed in the duct system. In an exemplary embodiment, the radius of curvature of the bottom wall 26 is 1.2 inches. If tension is applied to the cable in the duct system and the cable is forced against the bottom wall 26, the bend radius of the cable will be greater than the predetermined minimum bend radius thereby preventing bends in the cable and signal degradation associated therewith.

Tabs 28 are positioned at one end of the U-shaped channel 16. Tabs 28 are integral with the sides walls 24 and extend substantially perpendicular to the side walls 24. The tabs 28 prevent cables from becoming inadvertently dislodged from the base 14 when the cover 12 is not in place. Recessed areas 30, where a portion of the bottom wall 26 and the side walls 24 have been removed, and openings 32 are provided at the other end of the U-shaped channel 16. The recessed areas 30 and the openings 32 receive the end of the straight duct 4, shown in FIG. 2, that is flush with the outside corner of the wall. The recessed areas 30 and openings 32 allow the end of straight duct 4 to be parallel to the first extension 18.

The first extension 18 is located at the end of the U-shaped channel 16 where recesses 30 are formed. The first extension 18 is flat and extends away from the U-shaped channel 16 tangent to the bottom wall 26. When mounted to the wall, the first extension 18 is positioned within straight duct 2 as shown in FIG. 2. In accordance with an important aspect of the invention, the length of the first extension 18 is less than the length of the edge 40 of the support rib 22 that contacts straight duct 4. The base 14 has a first surface made up of extension 18 positioned adjacent to one wall and a longer surface, including support rib 22 and second extension 20, positioned adjacent to the other wall 5. The cover 12 similarly has short edges 34 and long edges 36 perpendicular to the short edges 34. The short edges 34 on the cover 12 are advantageous because any gaps between the wall 7 and the cover 12, due to a wall that is not 90 degrees, will be minimized due to the short length of edge 34.

The second extension 20 is arcuate and is made up of a neck 38 and a pad 39. The arc of the second extension 20 joins the arc of the bottom wall 26 at mutual tangent points to provide a smooth transition from the bottom wall 26 to the second extension 20. The neck 38 has a width less than the width of bottom wall 26 and less than the width of the pad 39. The pad 39 has a width that is less than the inside width of the straight duct 4. The end of the U-shaped channel 16 is positioned above the pad 39. These features allow the second extension 20 to be placed within the interior of the straight duct 4, as shown in FIG. 2. The side walls of straight duct 4 to extend past the pad 39, are positioned around the support rib 22 and engage the recesses 30 and openings 32 formed in the opposite end of the channel 16. Accordingly, the support rib 22 is positioned in straight duct 4. As described above, this allows the installer to extend the straight ducts 2 and 4 to be flush with the outside corner of the wall thereby facilitating installation.

Figure 6:
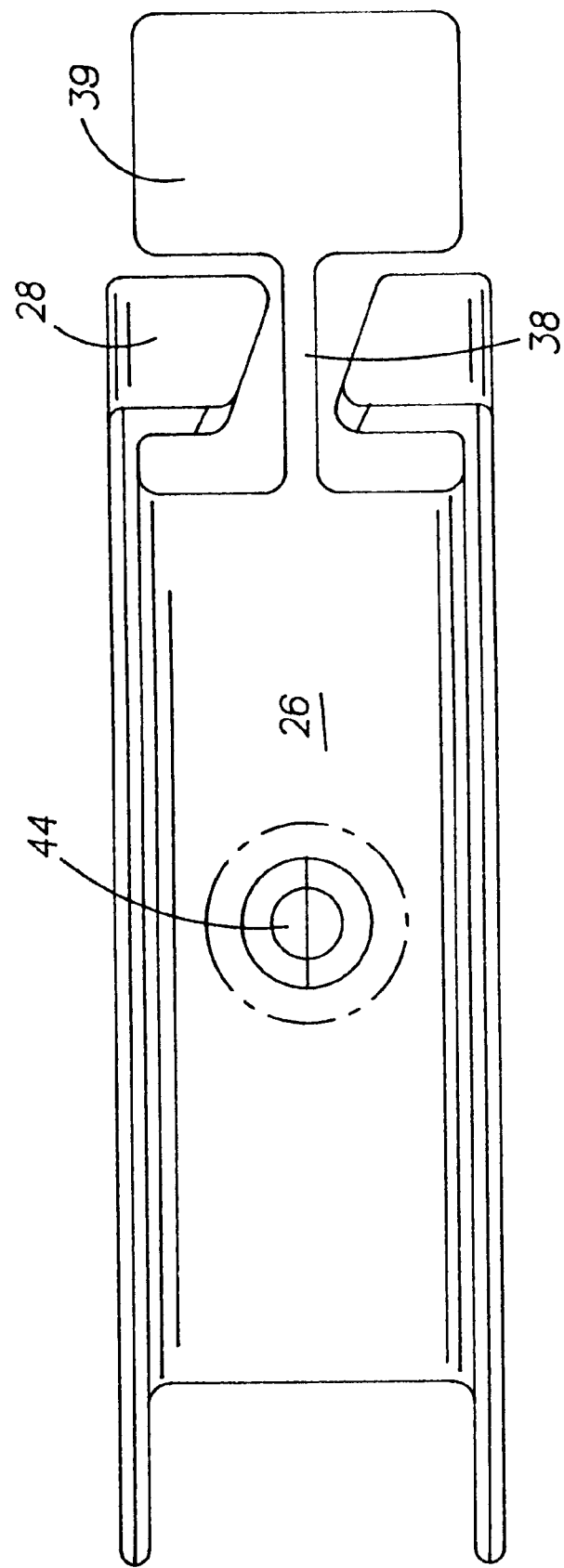
FIG. 6 is a top view of the base.
Figure 7:
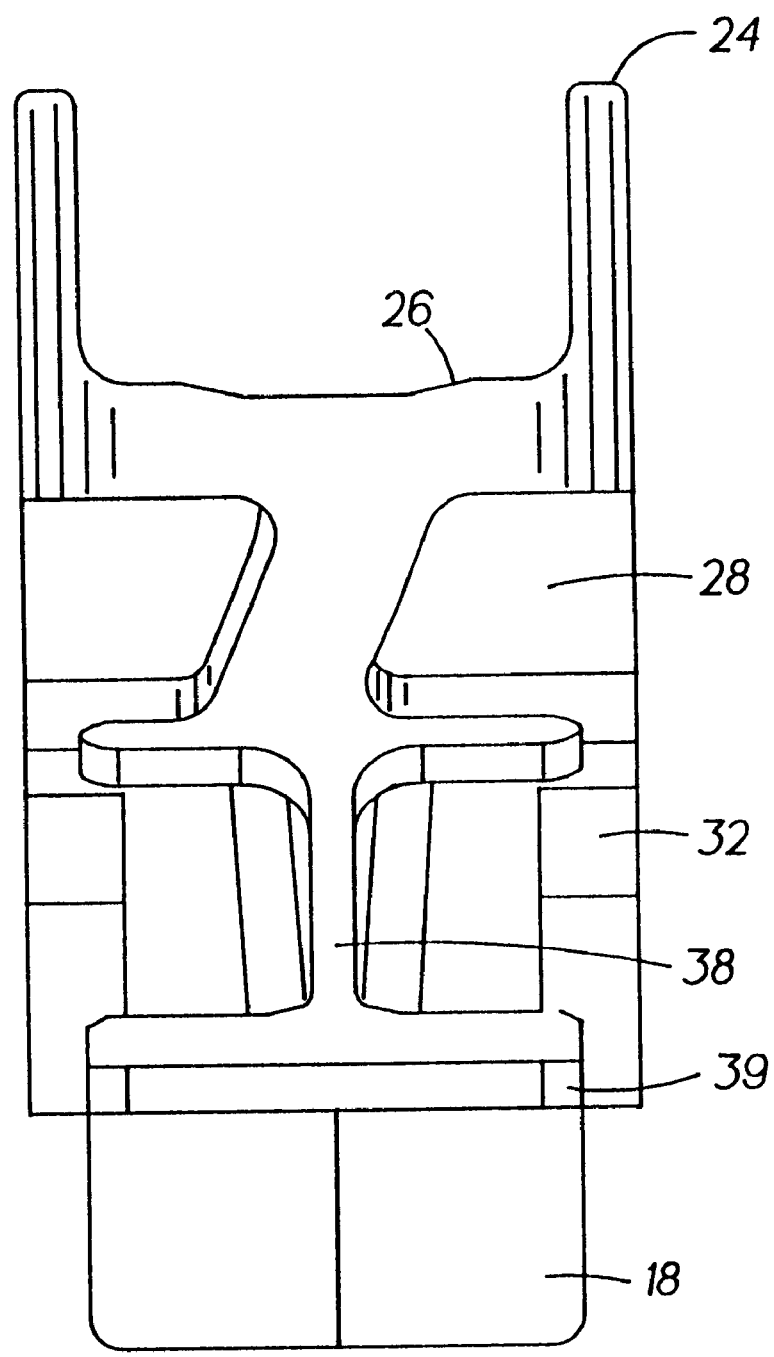
FIG. 7 is a front view of the base.
Figure 8:
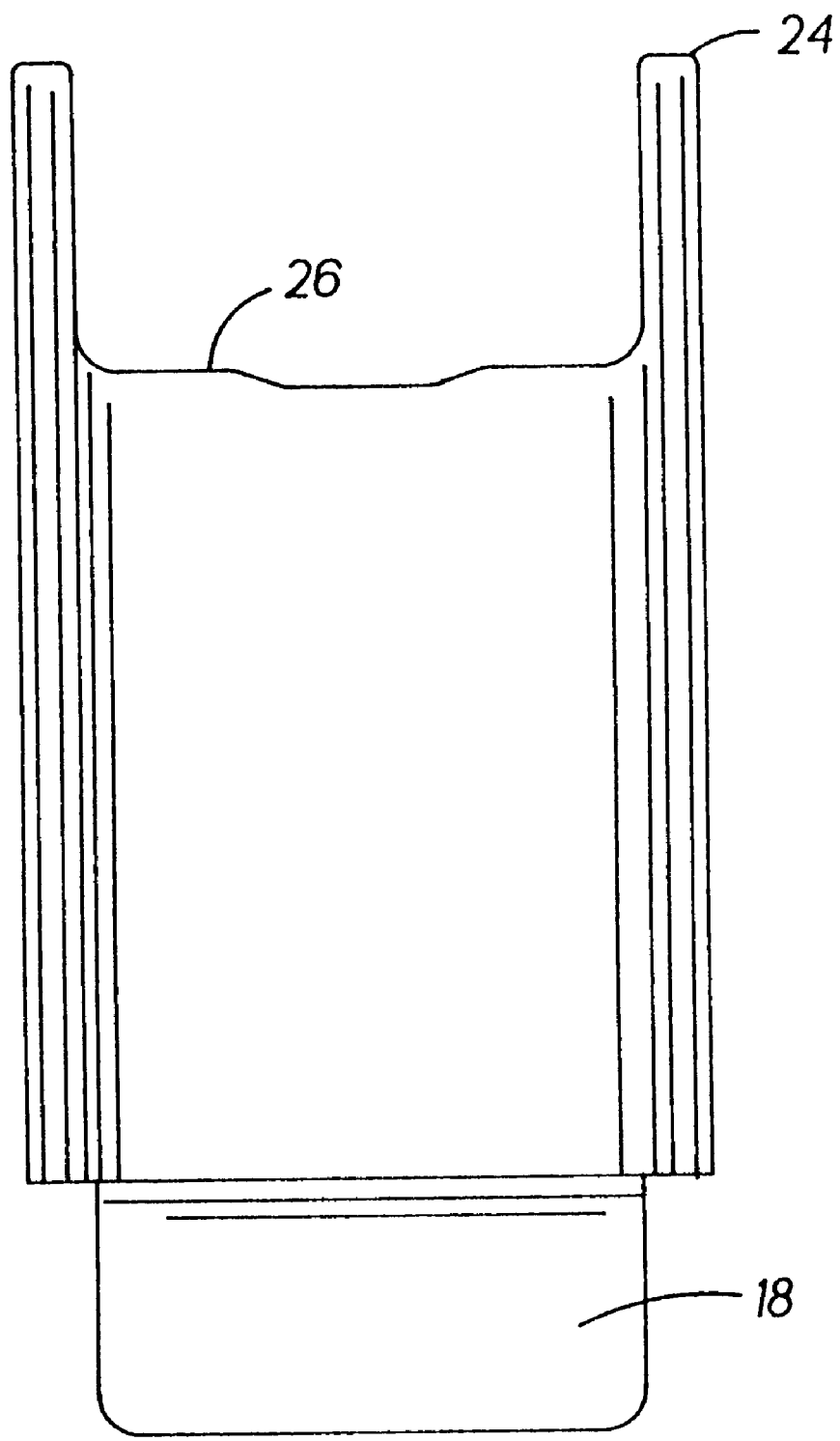
FIG. 8 is a rear view of the base.

The support rib 22 supports the U-shaped channel 16 and the second extension 20. The support rib 22 has a flat edge 40 that contacts the interior of the straight duct as shown in FIG. 2. A conical member 42 is integral with the support rib 22 and extends from the flat edge 40 to the bottom wall 26 of the U-shaped channel 16. An opening 44, shown in FIG. 6, is provided through the conical member 42 to allow a fastener (e.g. a screw) to mount the base 14 to the wall 7. FIGS. 4–8 are various views of the base 14 and illustrate elements described above.

Figure 9:
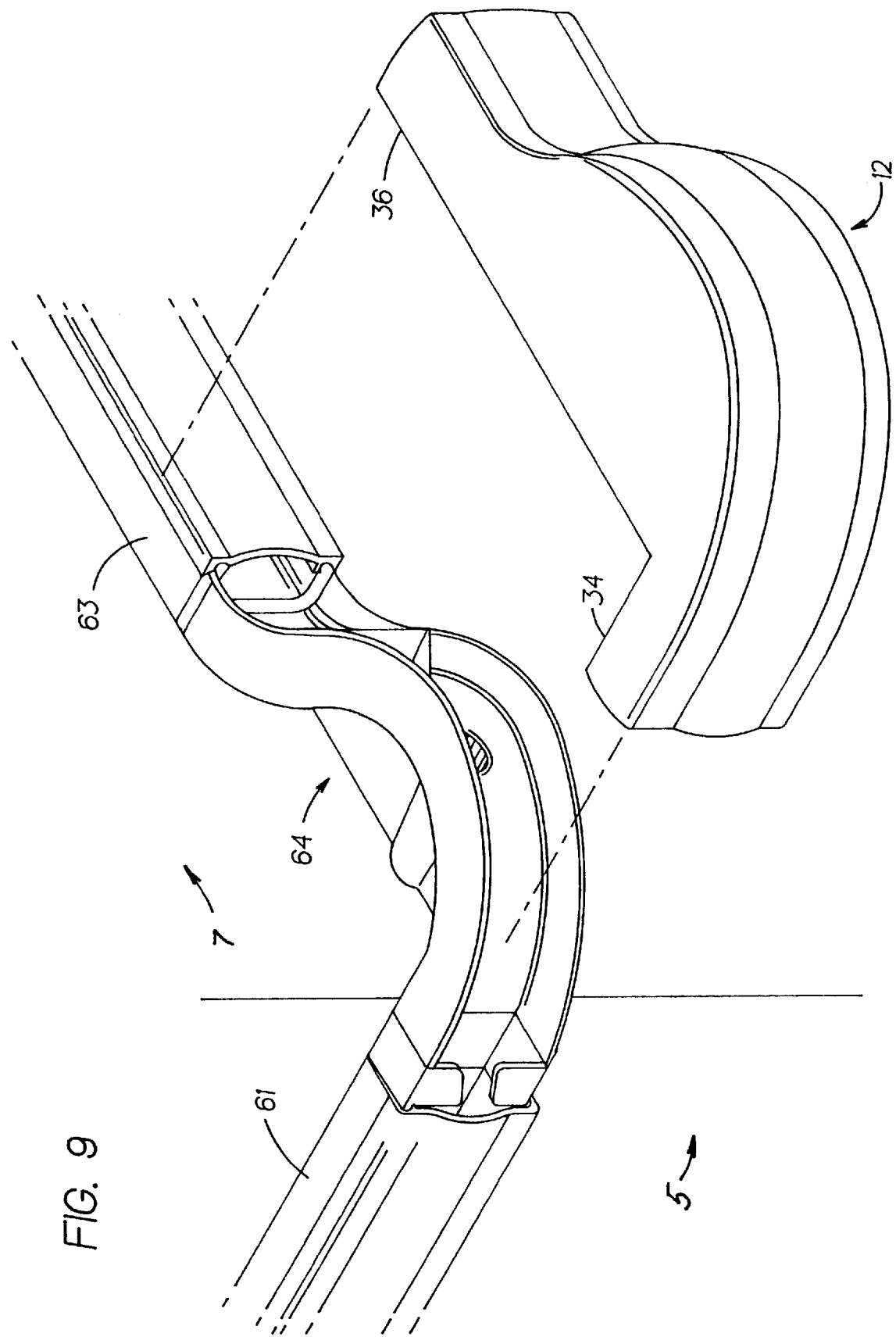
FIG. 9 is an exploded, perspective view showing an outside corner fitting cover detached from an outside corner fitting base in a second embodiment.

FIG. 9 is an exploded, perspective view showing an outside corner fitting cover detached from an outside corner fitting base in a second embodiment. The outside corner fitting in the second embodiment uses the same cover 12 but a different base 64. As shown in FIG. 9, the straight ducts 61 and 63 must be cut by the installer to be a predetermined distance from the outside corner of the wall. The base 64 does not fit within the straight duct sections 61 and 63, but rather abuts against the end of each straight duct.

Figure 10:
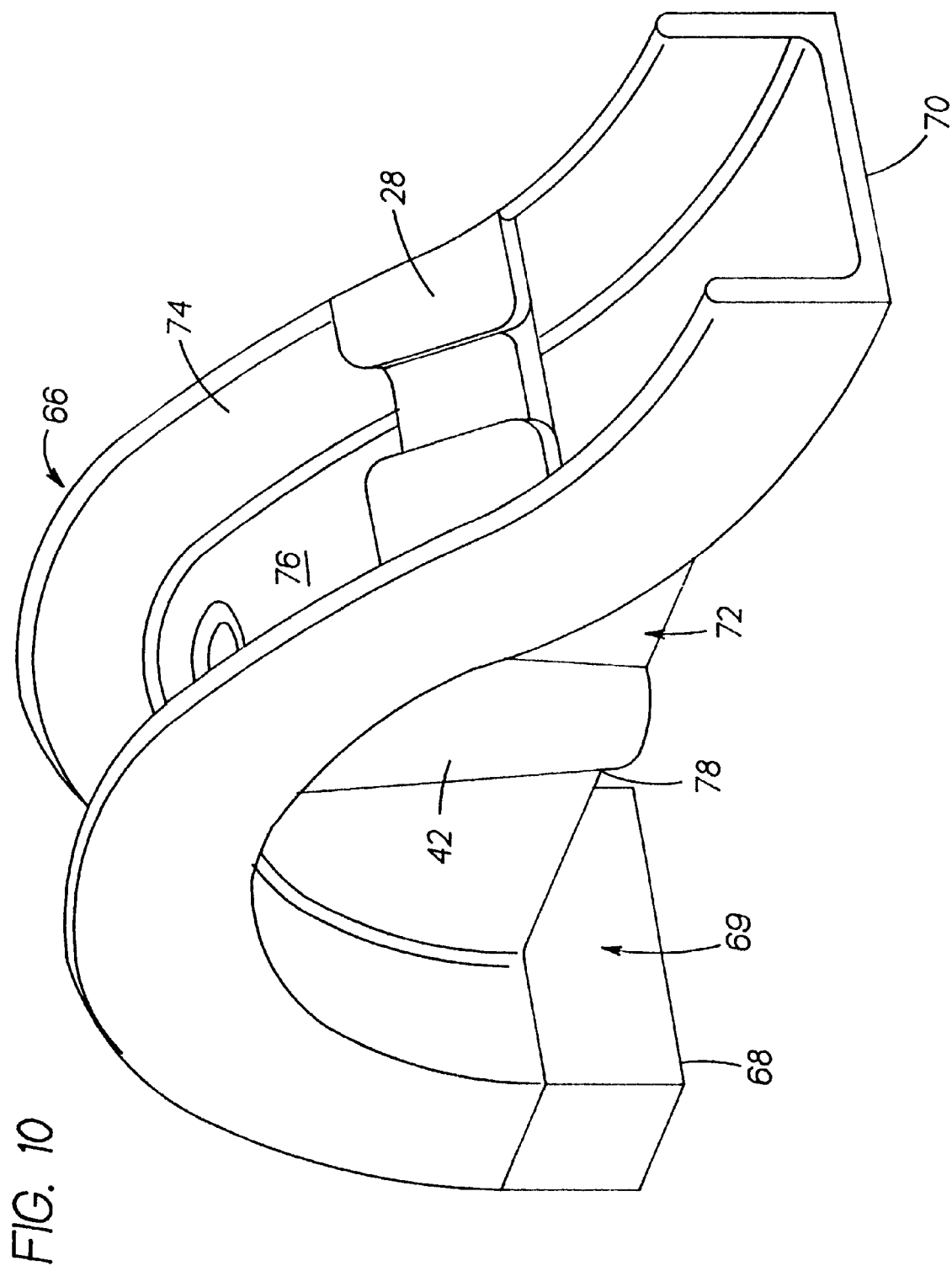
FIG. 10 is a perspective view of the base of the outside corner fitting in the second embodiment.
Figure 11:
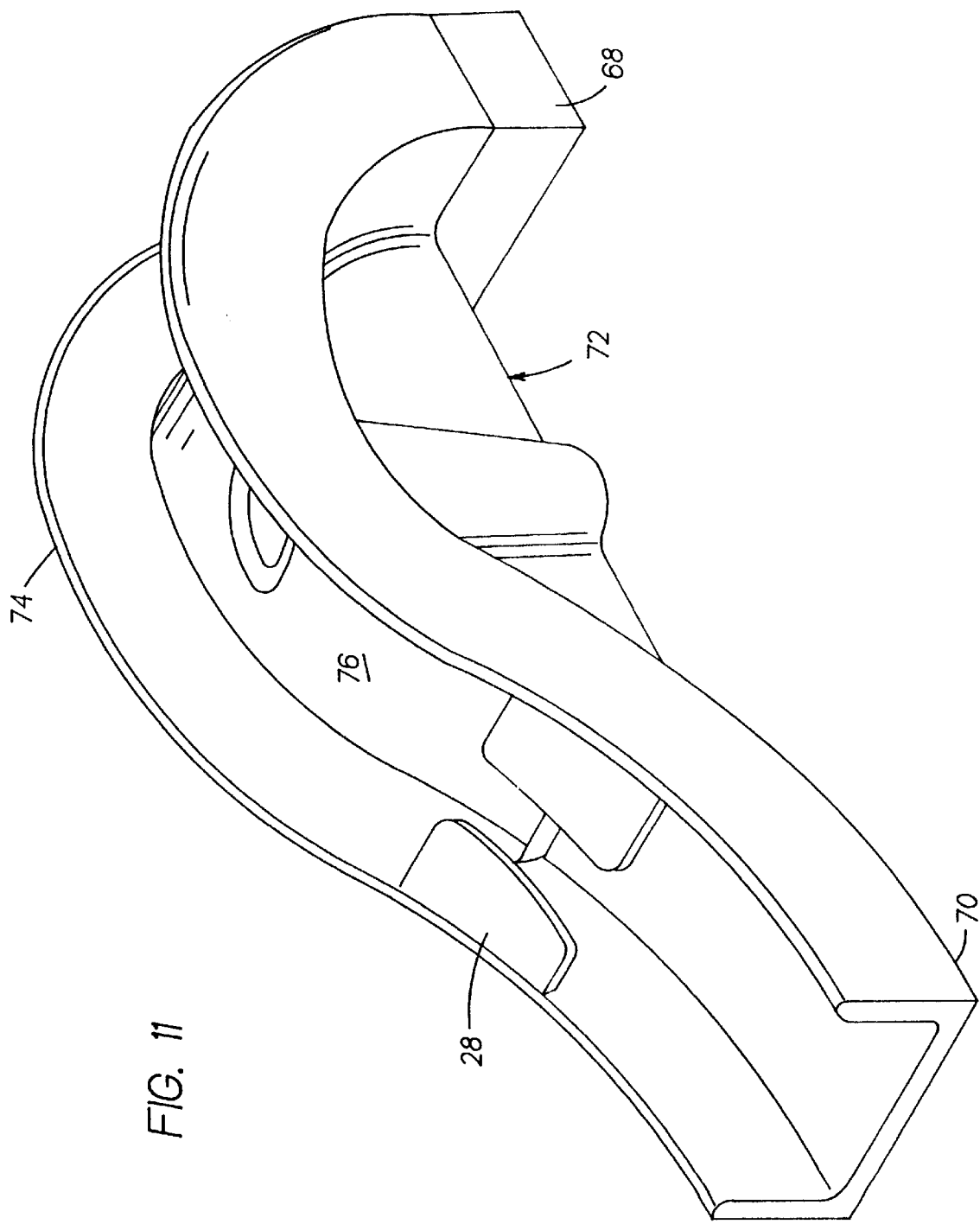
FIG. 11 is another perspective view of the base in the second embodiment.
Figure 12:
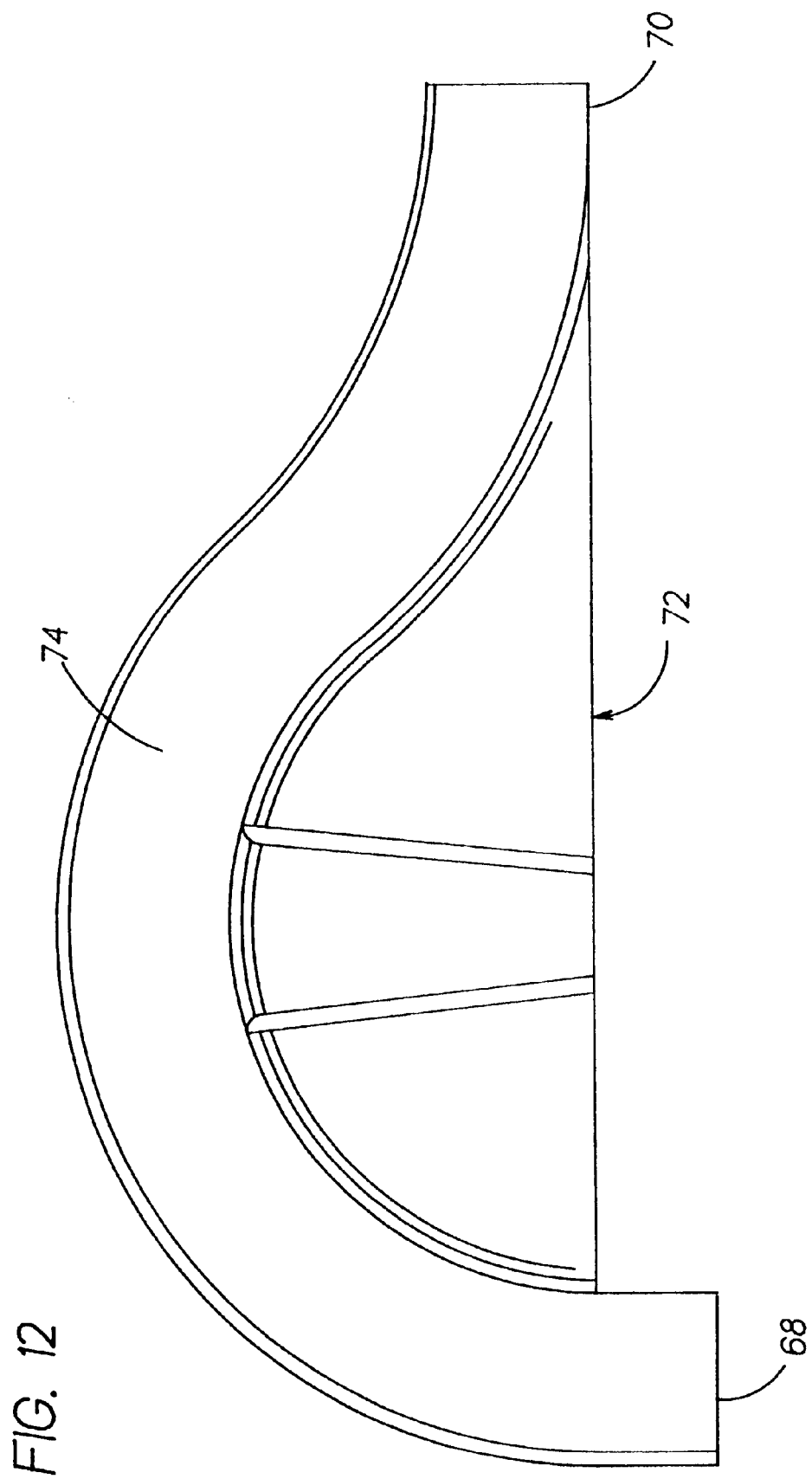
FIG. 12 is a side view of the base in the second embodiment.

FIG. 10 is a perspective view of the base 64 in accordance with the second embodiment of the present invention. The base 64 is made up of an arcuate channel 66 having a first end 68, a second end 70 and a support rib 72. The U-shaped channel 66 includes side walls 74 and a bottom wall 76. The U-shaped channel 66 in the second embodiment differs from the U-shaped channel 16 in the first embodiment in that the side walls 74 extend from the first end 68 to a point where the channel 66 is tangent to the edge 78 of support rib 72. The U-shaped channel 16 in FIG. 3 extends from the first extension 18 but stops prior to becoming tangent to the edge 40 of support rib 22. The channel 66 has a first radius of curvature from the first end 68 to approximately the position where tabs 28 are located. This first radius of curvature is greater than the predetermined minimum bend radius. The curve of the channel 66 then reverses and the channel 66 has a second radius of curvature from the tabs 28 to the second end 70. In addition, recessed areas 30 and openings 32 shown in FIG. 3 are eliminated from channel 66.

When mounted to the straight ducts, the first end 68 abuts against the straight duct 61 as shown in FIG. 9. The first end of the channel 68 extends perpendicular to the edge 78 of the support rib 72. In accordance with an important aspect of the invention, the portion of the channel 66 that extends past the edge 78 is shorter than the length of edge 78. In other words, surface 69 has a length that is less than the length of the surface of edge 78. Because the base 64 has a short portion 69 adjacent to one wall and a longer portion 78 adjacent to the other wall 5, the cover 12 has short edges 34 and long edges 36 perpendicular to the short edges 34. The short edge 34 on the cover 12 is advantageous because any gaps between the wall and the cover 12, due to a wall 7 that is not 90 degrees, will be minimized due to the short length of edge 34.

Figure 13:
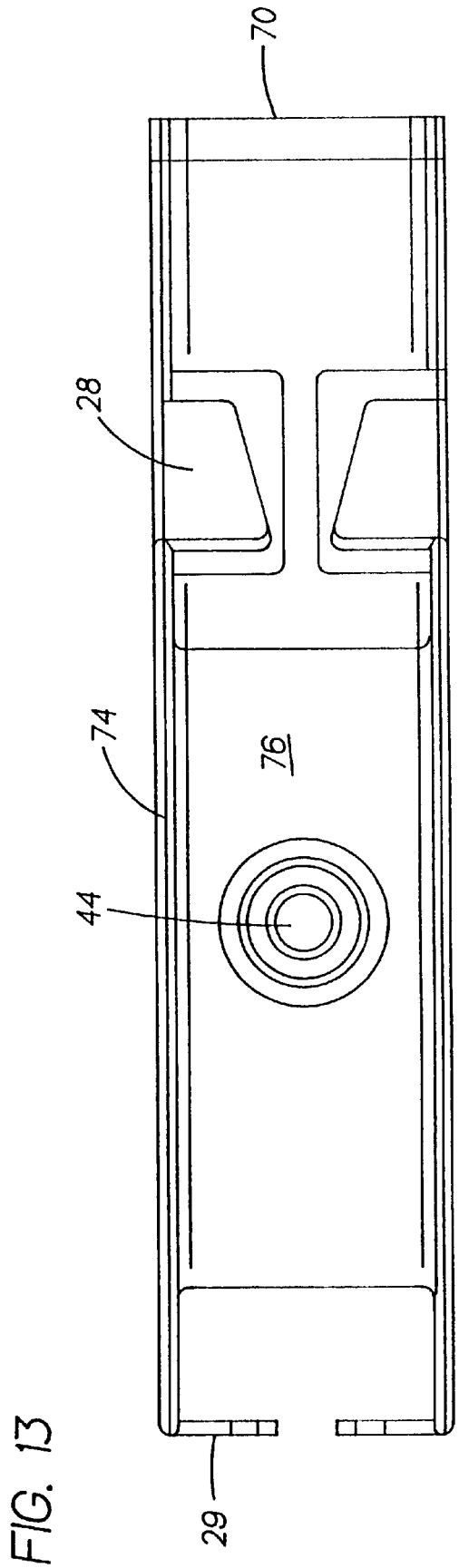
FIG. 13 is a top view of the base in the second embodiment.
Figure 14:
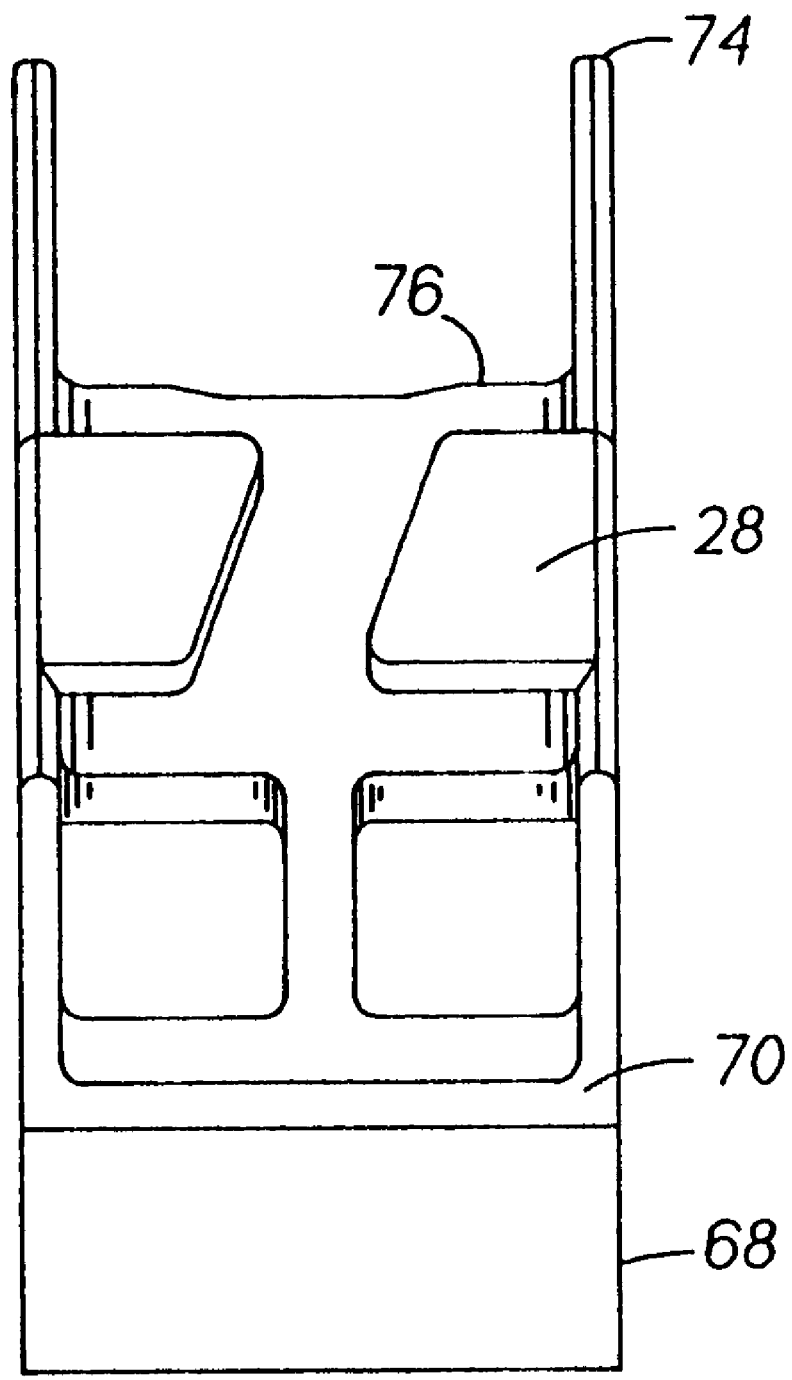
FIG. 14 is a front view of the base in the second embodiment.
Figure 15:
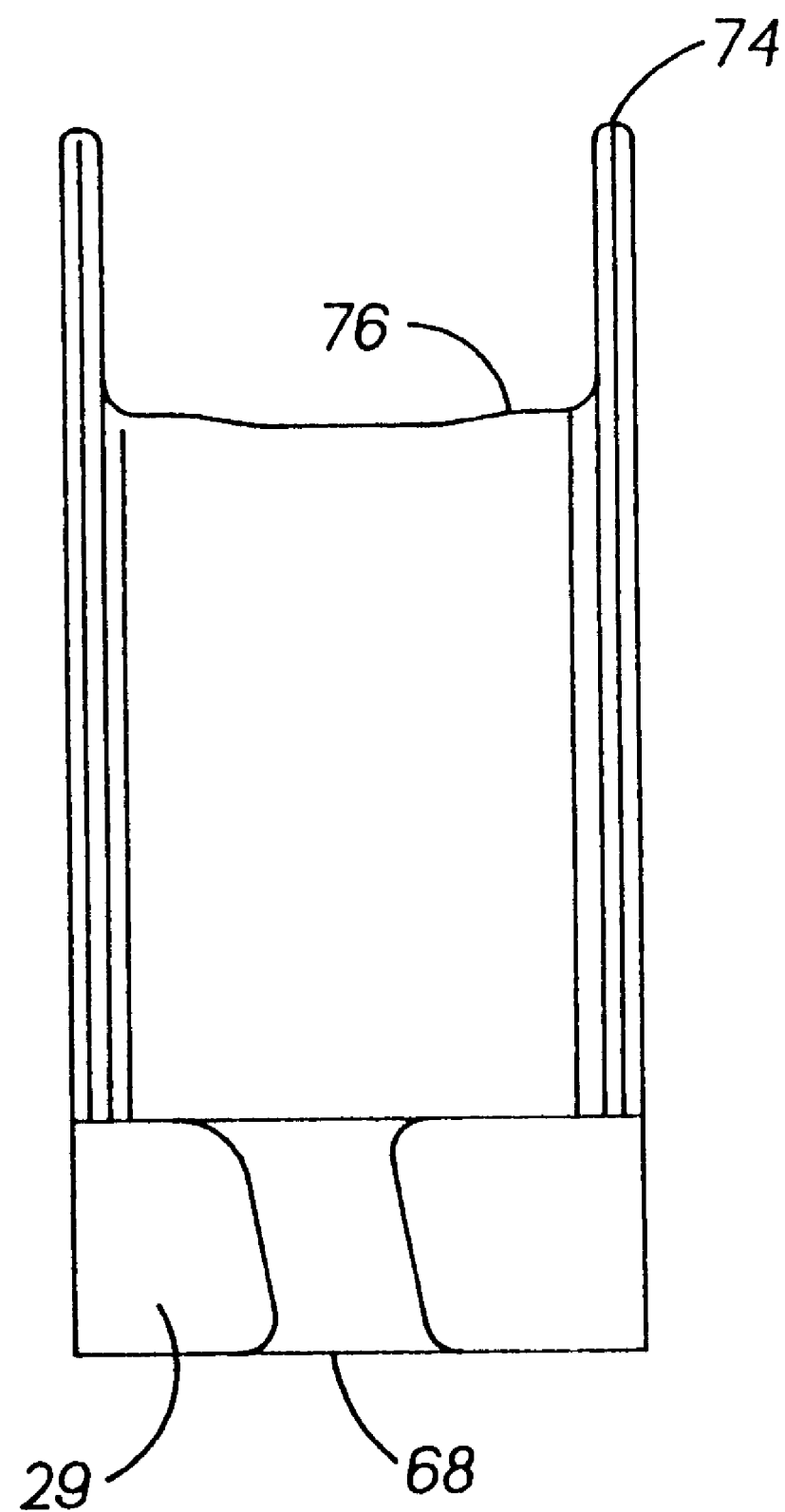
FIG. 15 is a rear view of the base in the second embodiment.

The support rib 72 supports the U-shaped channel 66. The support rib 72 has a flat edge 78 that is positioned adjacent to a wall as shown in FIG. 9. A conical member 42 is integral with the support rib 72 an extends from the flat edge 78 to the bottom wall 76 of the U-shaped channel 66. An opening 44, shown in FIG. 13, is provided through the conical member 42 to allow a fastener (e.g. a screw) to mount the base 64 to the wall. FIGS. 11–15 are various views of the base 64 and illustrate elements described above. As shown in FIG. 13, the base 64 includes additional tabs 29, positioned near the first end 68 of the channel 66. The tabs 29 are similar to tabs 28 and extend into the channel 66 perpendicular to side walls 74.

The outside corner fitting of the present invention includes an arcuate channel having a radius of curvature greater than a predetermined minimum bend radius for the cable to be installed in the duct system. Thus, even if tension is applied to the cable forcing the cable against the channel, the bend of the cable will not go below the predetermined minimum bend radius. A first embodiment of the invention fits within straight ducts and allows the straight ducts to be placed flush with the outside corner of the wall. A second embodiment features an outside corner fitting that abuts against the straight duct sections and is mounted directly to the wall.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An outside corner fitting for use with a duct system for routing cable, the outside corner fitting comprising:

a base including a channel for receiving a cable;

a support rib connected to said channel, wherein said support rib includes a conical member extending from a flat edge of said support rib to said channel, said conical member having an opening formed therein for receiving a fastener.

2. The outside corner fitting of claim 1, wherein said channel has a radius of curvature greater than a predetermined minimum bend radius of the cable.

3. An outside corner fitting for use with a duct system for routing cable, the outside corner fitting comprising:

a base including a channel for receiving a cable; a cover mountable to said base, said cover having a first short edge adjacent a first wall and a second long edge adjacent a second wall, said first short edge having a length less than a length of said second long edge; and a support rib connected to said channel.

4. The outside corner fitting of claim 3 wherein said outside corner fitting is used with a first straight duct and said outside corner fitting further comprises:

a first extension for placement within said first straight duct.

5. The outside corner fitting of claim 4 wherein said first extension is planar.

6. The outside corner fitting of claim 4 wherein said outside corner fitting is used with a second straight duct and said outside corner fitting further comprises:

a second extension for placement within said second straight duct.

7. The outside corner fitting of claim 3 wherein said channel further comprises channel recesses for receiving an end of a straight duct.

8. The outside corner fitting of claim 7 wherein said channel further comprises openings for receiving the end of the straight duct.

9. The outside corner fitting of claim 3, wherein said channel has a radius of curvature greater than a predetermined minimum bend radius of the cable.

10. The outside corner fitting of claim 3, wherein said first short edge is substantially perpendicular to said second long edge.

11. The outside corner fitting of claim 3, wherein said first short edge contacts said first wall and said second long edge contacts said second wall.

12. An outside corner fitting for use with a duct system for routing cable, the outside corner fitting comprising:

a base including a channel and a support rib connected to said channel, said channel for receiving a cable, said channel having a first surface and said support rib having a second surface which is generally perpendicular to said first surface, said first surface and said second surface intersecting at a point, wherein said first surface extends from said point a first distance and said second surface extends from said point a second distance, said first distance being less than said second distance, said first surface adjacent to a first wall and said second surface adjacent to a second wall.

13. The outside corner fitting of claim 12, wherein said channel has a radius of curvature greater than a predetermined minimum bend radius of the cable.

14. The outside corner fitting of claim 12, wherein said first surface contacts said first wall and said second surface contacts said second wall.

15. An outside corner fitting for use with a duct system for routing cable, the outside corner fitting comprising:

a base including a channel for receiving a cable, said channel having a predetermined width, wherein said outside corner fitting is used with a first straight duct and a second straight duct and said outside corner fitting further comprises:

a first extension for placement within said first straight duct, and a second extension for placement within said second straight duct, wherein said second extension is arcuate.

16. The outside corner fitting of claim 15 wherein said second extension comprises a neck and a pad, said neck being connected to said channel and said pad, wherein said neck has a width and said pad has a width.

17. The outside corner fitting of claim 16 wherein said width of said neck is less than said width of said pad and less than said width of said channel.

18. The outside corner fitting of claim 15, wherein said channel has a radius of curvature greater than a predetermined minimum bend radius of the cable.

* * * * *